`3,244,594`
1,6-BIS-(β-CHLORO-ETHYL-AMINO)-1,6-DEOXY-D-MANNITOL HEPARINATE
György Csaba and Jeneö Körösi, Budapest, Hungary, assignors to Egyesult Gyogyszer-es Tapszergyar, Budapest, Hungary
No Drawing. Filed Jan. 12, 1962, Ser. No. 165,958
2 Claims. (Cl. 167—74)

It is a known fact that the so-called cytostatic substances, frequently applied in recent times for the treatment of malignant tumors, are showing the general disadvantage of an unspecified effect. These substances are influencing not only the vital functions of tumor cells but exert their influence also on the other cells of the organism treated. These substances are consequently highly toxic, whereby their therapeutic application is exceedingly difficult.

It is moreover stated that in cases of tumor diseases the quantity of heparin present in the organism decreases considerably and at the same time the heparin containing so-called Ehrlich's mast-cells in the surroundings of tumors and other rampant tissues proliferate substantially. The multiplication of tumor cells therefore always requires heparin.

According to our observation the heparinic acid salts of basic substances of cytostatic activity as well as those of substances influencing the enzyme-system of the cells possessing an enzyme-inhibiting effect, contain a specific tumor-inhibiting effect, which is higher than the similar effect of the parent compound. This property of the new heparin compounds may be explained by the fact that these substances show a heparinoid biological character and therefore accumulate mainly within the cells of the organism, that is: in tumor cells. In this way it is the tumor cells which are damaged specifically by these substances and this also in a considerably high degree at low concentrations by which absolutely no or hardly perceptible cell-injuring effects are exerted on healthy tissues. This capacity of the heparin compounds mentioned is the more surprising, since the known constructive elements of heparinic acid, the D-glucuronic acid and D-glucuronic amide, show even a promoting effect on the progress of experimental tumors.

These new heparin compounds of specific tumor-inhibiting capacity may be prepared from heparinic acid (which is not absolutely bound to possess an anti-coagulant effect) and cytostatic substances applied in therapy and/or materials suitable for inhibiting those enzymes which play a part in the metabolism of tumor cells.

The acid component of the new salt-type compounds according to the invention is therefore the heparinic acid of strongly acidic reaction. This composition is used in therapy, predominantly in the form of its sodium salt, namely for the regulation of blood coagulation as well as in cases of transfusion and in the treatment of thromboses. The different natural heparin consist of macromolecular mixtures differing not only by their individual average molecular weight but also with respect to their chemical construction as well. Generally, heparinic acid can be characterized by the following structure that may be considered proven: it consists of equivalent quantities of D-glucosamide-N-sulfuric acid and D-glucuronic acid, every second D-glucuronic acid component being esterified at the $C_2$-hydroxyl group and every D-glucosamide component at the $C_4$-hydroxyl group with sulfuric acid, and also with $SO_3H$ groups linked to each N-atom of the latter.

The molecular weight of the repeatedly recurring tetrasaccharide units of the molecule amounts to 1002.8; each such tetrasaccharide unit contains five $SO_3H$ and two COOH groups.

The strong tendency of heparin to link to proteins may be explained by its high acidity resulting predominantly from $SO_3H$ groups. The heparin's effect on blood coagulation is influenced by its molecular weight as well as its sulfuric acid content. The average molecular weight of a heparin showing a good anti-coagulant effect amounts to roughly 20,000. But in different natural heparins the five $SO_3H$ groups do not appear always in the tetrasaccharide units, described above, but the number of these groups varies generally between two and five. Although fairly stable in alkaline medium, these natural heparins are inclined to hydrolyse in acidic media, their anti-coagulant activity decreasing or totally disappearing therefrom. The heparin-affinity of tumor cells however exists also for these heparins of reduced or no value in the therapeutic sense. In the present description "heparinic acid" means therefore every kind of the natural heparins mentioned above, in the form of free acid.

As basic components in the preparation of the new compounds according to the present invention, those cell-damaging active basic compounds may be used which are known either as therapeutically applicable cytostatica or as substances suitable for the inhibiting of enzymes that play a part in the metabolism of tumors. As starting substances of the procedure according to this invention, the most suitable among such substances with direct influence upon the division of cells, that may be applied in therapy, are the nitrogen mustards, nitrogen semi-mustards and the ethylene-imino-derivatives. Examples of these compounds are 1,6-bis-(β-chloroethylamino)-1,6-deoxy-D-mannitol and 2-[bis-(β-chloroethyl)-aminomethyl]-benzimidazole.

Among these enzyme-inhibiting compounds, the sulfon amides, e.g. p-amino-benzolsulfonamide, p-amino-benzolsulfaguanidine or 2-(4-amino-benzene-sulfonamido)-4-methylthiazole show inhibiting effect against glucose-6-phosphate dehydrogenase, lactic acid dehydrogenase, glucose dehydrogenase, cytochrome reductase, pyruric acid carboxylase, cytochrome oxydase, succino-dehydrogenase, etc. enzymes. Several alkaloids, e.g. quinine and some synthetic malaria remedies similar to quinine, e.g. 3-chloro-7-methoxy-9-(α-methyl-diethyl-amino-butylamino)-acridine, 6-methoxy-8-(δ-diethylamino-α-methylbutyl)-amino-quinoline and 7-chloro-(4-diethylamino-1-methyl-butylamino)-quinoline possess inhibiting activity against cytochrome-reductase, phosphoglycerol-aldehyde-dehydrogenase, phosphorilase, hexoquinase, cytochrome oxydase, pyruric acid dehydrogenase, phospho-glucomutase, lactic acid dehydrogenase, etc., enzymes.

Several organic compounds of arsenic, e.g. p-amino-phenyl-dichloroarsenide and 3-amino-hydroxyphenylarsic oxide similarly inhibit the function of the redox-enzyme-systems.

As generally known, enzyme-inhibiting effect is contained by different quinones as well, namely against e.g. pyruric acid-dehydrogenase, succino-dehydrogenase, pyruric acid-dehydrogenase, succino-dehydrogenase, pyruric acid-carboxylase and catalase. Concerning so-called quinone-nitrogen-mustards and the quinone-ethylene-imino-derivates, e.g. 2,5-bis-β-chloroethylamino-benzoquinone-(1,4), 2,5-bis-di-β-chloroethylamino-benzoquinone-(1,4), 2,5-bis-ethylene-imino-benzoquinone-(1,4) and 2,5-bis-n-propoxy-3,5-ethylene-imino-benzoquinone-(1,4), the simultaneous existence of both activities (cytostatic as well as enzyme-inhibiting effects) may be accepted (see S. Petersen, W. Gauss, E. Urbschat, Angew. Chem. 67, p. 217 (1955)), and W. Gauss and S. Petersen, Angew Chem. 69, p. 252 (1957).

As a related compound, the 2,5-bis-ethylene-imino-hydroquinone, whose tumor-inhibiting effect has been ascertained (see A. Marxer, Experimentia 11, p. 186 (1955)), may be considered as belonging to this type. Since compounds of this kind do not form any salts with heparin, their basic substituted derivatives, like e.g. 2,5-bis-β-dimethylamino - ethoxy - 3,6 - bis - ethylene - imino-benzoquinone - (1,4), 2,5 - dichlor - 3,6 - bis-β-piperidine-ethylamino-benzoquinone-(1,4) and 2,5-di-n-methylperazino-benzoquinone-(1,4), were used instead for the forming of salt.

Some salts of heparinic acid formed with organic bases had been already described in literature. These salts however do not contain any cytostatic compounds as basic components, nor such ones that possess an inhibiting capacity against enzymes playing part in the metabolism of tumor cells. These known heparin salts therefore do not contain any tumor-inhibiting property at all; they present at the most heparin-like anti-coagulant effects. Thus an aqueous solution prepared of 20 parts heparin and 1 part histamine (R. K. Sanyal and C. B. West, Nature 178, p. 1293 (1956)), as well as the heparin salts prepared with N,N'-bis-(α-methylbenzyl)-ethylenediamine (A. Cantone, Minerva Med. I. p. 230 (1953), respectively, with amido-acridines (K. S. Dodgson, F. A. Rosk and B. Spencer, Biochem. J. 60, p. 346, (1955)), had been described. These however do not possess any tumor-inhibiting activity at all.

The new heparin salts formed with cytostatic or enzyme-inhibiting compounds in the sense of the present invention may be prepared by reacting heparinic acid with one of the cytostatic or enzyme-inhibiting substances mentioned above. The components may be used in the equivalent quantities or in a mass-ratio of a lower quantity of the basic compound than the equivalent quantity calculated on the basis of the number of —NH—SO$_3$H and —O—SO$_3$H groups present. In the latter instance acidic heparin salts are obtained as products. Both kinds of heparin salts obtained as a product show the favorable tumor-inhibiting activity mentioned.

The reaction may be accomplished in an inorganic or organic solvent, preferably in water, lower primary alcohols or in the mixture of said solvents, favorably within the temperature range between —10° C. and +30° C.

The preparation of the new heparin derivatives according to the invention does not require heparinic acid in a solid, isolated form used as starting material aqueous or organic heparinic acid solutions obtained as a raw product of heparinic acid production may be used as the starting material as well.

These new heparin salts prepared according to the invention are generally easily soluble in water, the pH-value of their solution being dependent partly on the number of —SO$_3$— groups in the heparinic acid and partly on the quantity of the basic component applied. The relation of these factors is preferably chosen in a manner so as to obtain a pH-value of the product's aqueous solution between 1–5 and 7.

Prepared in the sense of the present invention, these new heparin derivates show a cytostatical activity that considerably surpasses the similar effect of cytostatic remedies known up to this time, since according to the specific manner of their activity, it is chiefly the tumor tissues that are affected by their influence. This is documented also by the fact that while 20–25 percent weight decrease of animals is caused by e.g. 8 mg. per kg.-doses of 1,6-bis-(β-chloroethylamino) - 1,6-deoxy-D-mannitol-dihydrochloride, on account of its cell-damaging effect in general, the salt of the same compound formed with heparinic acid, administered in doses of the same size does not result in any weight loss at all. On the other hand, considerably smaller doses, e.g. 2.5 mg. per kg. hydrochloride of the cytostatical compound mentioned do not show any tumor-inhibiting effect whatever, while the salt formed with heparinic acid produces a very noticeable tumor-inhibiting effect.

The practical execution of the method according to the invention is aptly demonstrated in the following examples.

*Example 1*

4.55 g. (0.012 mol) 1,6-bis-β-chloroethylamino-1,6-deoxy-D-mannitol-dihydrochloride are dissolved in 20 ml. water and, while ice-cooled, a solution of 1.34 g. (0.024 mol) potassium hydroxide in 5 ml. water is added to it. To this mixture a solution of 8.75 g. heparinic acid in 20 ml. water is then added. The resulting clear solution is evaporated at a temperature under 30° C. to a syrup-like density and mixed with 75 ml. abs. ethanol. The precipitating heparin compound is filtered, washed with 20 ml. abs. ethanol and then with 20 ml. anhydrous ether. 14.10 g. of 1,6-bis-β-chloroethylamino)-1,6-deoxy-D-mannitol-heparinate are obtained (theoretic yield:14.21 g.) in the form of a light cream-colored, amorphous product, soluble in water, containing 12.6 percent KCl and showing no characteristic melting point.

The substance 1,6-bis(β-chloroethylamino)-1,6-deoxy-D-mannitol-dihydrochloride (Degranol, Mannomustine), used as starting material, is a well known cytostatic drug the preparation of which is described in the publication of L. Vargha, etc., Journ. Chem. Soc. 1957, p. 805.

Heparinic acid, used in the reaction above, possesses an anti-coagulant activity of 3.2 IE per mg., has no characteristic melting point, becomes gradually discolored into brown over 180° C. and carbonizes over 205° C. Analysis: N 3.0 percent, S 13.15 percent. This heparinic acid contains per tetrasaccharide-unit, instead of the maximum 5, but 3.7 SO$_3$H groups as an average. The molecular weight of these recurrent tetrasaccharide-units is accordingly only 898, instead of 1002.8.

In the final product 80 percent of the SO$_3$H groups originally present in heparinic acid are bound by the basicity of the mannomustine; the presence of free SO$_3$H groups is also shown by the pH-value of the product's aqueous solution (3–3.5).

Mannomustine-heparinate prepared by the method described above has shown in animal tests the following results:

Crocker S. 180 tumor on mice: In case of a 10-days' treatment, daily doses of 25 mg. per kg. brought a 42 percent retardation of tumor growth. Comparing tests performed simultaneously with mannomustine-dihydrochloride showed, when treated with doses of the same mannomustine quantity, a 25 percent retardation of tumor growth only.

Solid Ehrlich-tumor: In case of a 10-days' treatment with daily doses of 25 mg./kg. mannomustine-heparinate resulted in a 63.6 percent retardation of the weight increase of tumors. The comparing tests performed simultaneously with mannomustine-dihydrochloride resulted in a 24 percent acceleration of tumor growth.

Németh-Kellner's ascites lymphoma: 100 mg. per kg. mannomustine-heparinate administered 24 hours and 48 hours after instilling the tumor; 6 days later a 76 percent retardation of tumor growth was ascertained.

*Example 2*

The proceeding is similar to that described in Example 1, except that instead of 0.012 mol mannomustine, the quantity equivalent to the total number of SO$_3$H groups present in heparinic acid, namely in the case of the heparin used in Example 1, 0.016 mol mannomustine is used. By this means the product obtained is a neutral salt containing KCl, showing in aqueous solution the pH-value of 5.5–6. This product brought in animal tests results equivalent to those described in Example 1.

*Example 3*

0.55 g. pure mannomustine-base (decomposition point 278° C.; preparation see Vargha etc., loc. cit.) and 1.31 g. heparinic acid (quality like in Example 1) are dissolved in 15 ml. water. The clear solution is evaporated under ventilation or vacuum at a temperature under 30° C. to syrup-like density. By addition of 20 ml. abs. ethanol the KCl-free mannomustine-heparinate of slight acidity is precipitated, then filtrated and washed with 10 ml. abs. of ethanol and afterwards with anhydrous ether 1.81 g. of KCl-free mannomustine-heparinate are obtained, showing when analysed 4.26 percent nitrogen-content. As a consequence of its higher purity this product possesses an accordingly increased effect.

Solid Ehrlich-tumor: In case of a 10-days' treatment with daily doses of 150 mg. per kg., the retardation of tumor growth amounted to 55 percent.

Benevolenskaia-sarcoma: In case of a 21-days' treatment of a rat instilled with Benevolenskaia-sarcoma, with the daily doses of 60 mg. per kg., a 64 percent retardation of tumor growth was achieved.

Yoshida-sarcoma on rats: In case of a 7-days' treatment with daily doses of 50 mg. per kg., a 99.2 percent retardation was achieved.

Example 4

0.90 g. heparinic acid (containing on the average 3.5 $SO_3H$ groups per tetrasaccharide-unit, and showing an anti-coagulant effect) and 0.80 g. of sulfaguanidine are dissolved in water. The solution is filtered and evaporated in vacuo to dryness at room temperature. The salt, obtained as residue, is introduced along with 20 ml. abs. ethanol upon a filter and washed with anhydrous ether. The yield makes 1.62 g. sulfaguanidine-heparinate. This product does not show any melting point and carbonizes gradually over 180° C. The pH-value of its 5 percent solution is 2. Analysis: N 13 percent.

Salts formed with heparinic acid may be prepared also from the following sulfamides: p-aminobenzol-sulfamide, 2-(4-aminobenzol-sulfamido)-4-methyl-thiazol and 2-sulfanil-amido-4,6-dimethyl-pyrimidine.

These products also have shown good tumor-inhibiting effects in animal tests. p-Aminobenzolsulfamide-heparinate effected a 24 percent growth retardation of a solid Ehrlich-tumor by a 10-days' treatment with daily doses of 40 mg. per kg. In the case of 2-(4-aminobenzolsulfamido)-4-methylthiazole a 40 percent retardation was found under similar conditions; in the case of sulfaguanidine-heparinate the retardation amounted to 49.8 percent; and 2-sulfanilamido-4,6-dimethyl-pryrimidine-heparinate effected under identical conditions a 25 percent retardation.

Example 5

0.655 g. heparinic acid (with 13.15 percent sulphur content, containing consequently on the average 3.7 $SO_3H$ groups per tetrasaccharide-unit; possessing 3 IE per mg. anti-coagulant effect) are dissolved in 15 ml. water, and 0.144 g. 2,5-bis-ethylene-imino-hydroquinone are added to the solution. The solution is then evaporated in vacuo at room temperature to dryness. The feebly acidic salt obtained as residue is introduced upon a filter with 10 ml. abs. ethanol and washed with 10 ml. anhydrous ether. Yield: 0.75 g. Analysis: N 5.05 percent. This product is soluble in water, pH value of the solution: 5.5.

Example 6

0.850 g. heparinic acid (sulphur-content 11.75 percent, containing consequently 3.1 $SO_3H$ groups per tetrasaccharide-unit, showing no anti-coagulant activity) are dissolved in 25 ml. water, then the solution is mixed with 0.636 g. D(—)-threo-1-p-nitrophenyl-2-amino-1,3-propanediol. The clear solution obtained showing a pH value of 6 is processed as in Example 4. Yield: 1.40 g. This product, readily soluble in water, effected in 34 percent retardation of the growth of solid Ehrlich-tumor when treated for 10 days with daily doses of 100 mg. per kg.

Example 7

0.850 g. heparinic acid (quality like in Example 6) are dissolved in 25 ml. water and 0.465 g. 7-chloro-4-(4-diethylamino-1-methylbutylamino)-quinoline are added to the solution. This mixture is processed in the usual way. The aqueous solution of the salt obtained possesses a pH-value of 4.2. Its analysis corresponds to the calculated values. This product achieves a 25 percent retardation of the solid Ehrlich tumor in the case of a 10-days' treatment with 150 mg. per kg. daily doses.

Example 8

1.7 g. heparinic acid (quality like in Example 6) are dissolved in 40 ml. water and 1.07 g. 2,5-bis-$\beta$-dimethyl-aminoethoxy - 3,6 - bis - ethylene - imino - benzoquinone-(1,4) are added (melting point 60–61° C.). This solution (pH=6) is filtered and evaporated within 3 hours in a cup of large surface to a syrup-like density. 30 ml. of acetone are added to the concentrated solution obtained and the precipitating light brown salt is filtered and washed three times with 10 ml. acetone. Yield: 2.62 g. (92 percent of the theoretical quantity).

What we claim is:
1. 1,6 - bis - ($\beta$ - chloro - ethyl - amino) - 1,6 - deoxy-D-mannitol heparinate.
2. A method of producing 1,6-bis-($\beta$-chloro-ethyl-amino)-1,6-deoxy-D-mannitol heparinate, comprising reacting a member of the class consisting of 1,6-bis-($\beta$-chloro-ethyl-amino)-1,6-deoxy-D-mannitol and its dihydrochloride, with heparinic acid in an aqueous medium, to obtain a precipitate of the product, and separating said precipitate from the reaction medium.

References Cited by the Examiner

UNITED STATES PATENTS

| | | | |
|---|---|---|---|
| 2,561,384 | 7/1951 | Lee et al. | 260—210 |
| 2,571,593 | 10/1951 | March et al. | 260—243 |
| 2,778,769 | 1/1957 | Fahrenbach et al. | 167—74 |
| 2,786,050 | 3/1957 | Capraro et al. | 260—211 |
| 2,830,932 | 4/1958 | Cushing et al. | 167—74 |
| 2,959,583 | 11/1960 | Doczi | 260—234 |
| 2,989,438 | 6/1961 | Nomine et al. | 167—74 |
| 3,000,787 | 9/1961 | Bianchini | 167—74 |
| 3,033,750 | 5/1962 | Velluz et al. | 167—74 |
| 3,033,751 | 5/1962 | Velluz et al. | 167—74 |
| 3,058,884 | 10/1962 | Mozen et al. | 167—74 |
| 3,152,147 | 10/1964 | Vargha et al. | 260—340.9 |

OTHER REFERENCES

C.A. 27, #5115(5) (Arsphenamine) (1933).
C.A. 43, #5865b, #7109D (Toluidine Blue) (1949).
C.A. 44, #4204F, #5009F (Dyes) (1950).
C.A. 46, #4569G (Ephedrine Alkaloid) (1952).
C.A. 47, #2375F (Trypaflavine) (1953).
C.A. 47, #11506I–11507A (Antiheparin Dyes) (1953).
C.A. 48, #11640H (1954).
C.A. 49, #13305E (9-Aminoacridine) (1955).
C.A. 51, #13142H (1957).
C.A. 52, #4831C (Neomycin and Polymixin) (1958).
C.A. 54, #21446G, #23051A, #25260B (1960).
C.A. 55, #2898A–H, #2911E (1961).
Sellei et al.: "Clinical Observations With 1,6-Bis(B-Chloroethyl - Amino) - 1,6 - Deoxy - D - Mannitol Dihydrochloride (BCM) in Malignant Diseases," pp. 1164–1180, Annals, N.Y. Acad. Sci. 68(3) (1958).

LEWIS GOTTS, *Primary Examiner.*

MORRIS O. WOLK, *Examiner.*

S. K. ROSE, *Assistant Examiner.*